US010495751B2

(12) United States Patent
Moreira Neto et al.

(10) Patent No.: US 10,495,751 B2
(45) Date of Patent: Dec. 3, 2019

(54) SYSTEM AND METHOD FOR DETECTING AND VISUALIZING TARGETS BY AIRBORNE RADAR

(71) Applicant: BRADAR INDUSTRIA S.A., São José dos Campos-SP (BR)

(72) Inventors: João Roberto Moreira Neto, Valinhos-SP (BR); Kostyantyn Alexandrovich Lukin, Kharkov (UA)

(73) Assignee: BRADAR INDUSTRIA S.A., Sao Jose dos Campos (BR)

( * ) Notice: Subject to any disclaimer, the term of this patent is extended or adjusted under 35 U.S.C. 154(b) by 237 days.

(21) Appl. No.: 15/361,238

(22) Filed: Nov. 25, 2016

(65) Prior Publication Data

US 2017/0153325 A1 Jun. 1, 2017

(30) Foreign Application Priority Data

Nov. 27, 2015 (BR) .............................. 102015029775

(51) Int. Cl.
*G01S 13/90* (2006.01)
*G01S 13/42* (2006.01)
(Continued)

(52) U.S. Cl.
CPC .......... *G01S 13/904* (2019.05); *G01S 13/424* (2013.01); *G01S 13/426* (2013.01); *G01S 13/878* (2013.01); *G01S 13/94* (2013.01); *G01S 13/9082* (2019.05)

(58) Field of Classification Search
CPC .... G01S 13/426; G01S 13/9035; G01S 13/95; G01S 13/951; G01S 2013/9082;
(Continued)

(56) References Cited

U.S. PATENT DOCUMENTS 3,308,675 A * 3/1967 Jonsson .................. F41A 27/06
200/6 A
4,562,439 A * 12/1985 Peralta .................... G01S 13/89
342/179
(Continued)

FOREIGN PATENT DOCUMENTS

BR        PI0711331 A2    8/2011
BR   10 2012 013956-1 A2    4/2014
(Continued)

OTHER PUBLICATIONS

Extended European Search Report and European Search Opinion dated Apr. 10, 2017, issued in European Patent Application No. 16200904.7, 8 pages.
(Continued)

*Primary Examiner* — Timothy A Brainard
(74) *Attorney, Agent, or Firm* — Nixon & Vanderhye, P.C.

(57) ABSTRACT

A SYSTEM FOR DETECTING AND VISUALIZING TARGETS BY AIRBORNE RADAR, comprising a plurality of N antennae with a narrow beam in elevation and wide in azimuth, regularly disposed on a rotary base coupled to an engine, the elevation orientations of said antennae being staggered according to a defined pattern, each antenna being associated to a radar device endowed with computer means furnishing information relating to distance, azimuth, elevation and speed of fixed and moving obstacles above and below the plane of said rotary base. Some antennae point towards a place above the horizon, the angles of view being progressively descending so as to cover a volume that extends above and below the plane of the horizon, and may reach the ground. Said volume results from the sum of the volumes of superimposed cones, each cone corresponding to an elevation angle. The system combines the images of the
(Continued)

N conical volumes to provide the pilot or operator a three-dimensional image.

20 Claims, 3 Drawing Sheets

(51) Int. Cl.
    *G01S 13/87*     (2006.01)
    *G01S 13/94*     (2006.01)

(58) Field of Classification Search
    CPC ..... G01W 1/02; H01Q 13/20; H01Q 21/0056; H01Q 3/08
    USPC ........................................................ 342/25 R
    See application file for complete search history.

(56) References Cited

U.S. PATENT DOCUMENTS

| | | | |
|---|---|---|---|
| 5,017,922 A | | 5/1991 | Klausing et al. |
| 5,414,907 A | * | 5/1995 | Kiapos ................... G02C 11/02 24/116 A |
| 5,451,957 A | * | 9/1995 | Klausing ............... G01S 13/904 342/25 F |
| 5,614,907 A | * | 3/1997 | Kreitmair-Steck .... G01C 15/14 342/25 F |
| 9,130,255 B2 | * | 9/2015 | Rogozine .............. H01P 1/2088 |
| 2003/0001770 A1 | * | 1/2003 | Cornell ..................... G01S 7/20 342/26 R |
| 2005/0128126 A1 | | 6/2005 | Wolframm et al. |
| 2013/0069819 A1 | | 3/2013 | Braun et al. |
| 2015/0177377 A1 | * | 6/2015 | Moreira Neto ....... G01S 13/426 342/25 R |
| 2015/0301168 A1 | * | 10/2015 | Brown ..................... G01S 7/03 342/146 |

FOREIGN PATENT DOCUMENTS

| | | | |
|---|---|---|---|
| DE | 44 20 153 B3 | 10/2013 | |
| EP | 2 741 106 A1 | 6/2014 | |
| WO | 92/07282 A1 | 4/1992 | |
| WO | WO-2013185195 A1 | * 12/2013 | ........... G01S 13/426 |

OTHER PUBLICATIONS

Communication Pursuant to Article 94(3) EPC dated Mar. 19, 2019, issued in European Patent Application No. 16200904.7, 6 pages.

* cited by examiner

SYSTEM AND METHOD FOR DETECTING AND VISUALIZING TARGETS BY AIRBORNE RADAR

This application claims priority to BR 102015029775-0 filed Nov. 27, 2015, the entire content of which is hereby incorporated by reference.

FIELD OF THE INVENTION

The present invention pertains to airborne radar techniques, more particularly in the presentation of fixed and moving obstacles in low altitude flights.

DESCRIPTION OF THE STATE OF THE ART

The Synthetic Aperture Radar (SAR) systems, airborne or orbital, have evolved significantly with the combination of the use of various frequencies or bands, X, L, P and the polarization (indicates the direction of the electric field of the wave transmitted or received), Vertical (V) or Horizontal (H) of the signals emitted and received, with equal or inverted polarization (VV, HH or VH), obtaining high definition images, in color and 3D. The combinations of the techniques used are dictated by the objective to be achieved, maps, level curves, surface model, treetop height and others, or flight control systems for the pilot, which will be the area applied to the present invention.

There are various types of radars on the market, on-board aircrafts, for pilot orientation, especially for helicopters, which provide information to the pilot. The most prominent are radars with rotary antenna that is, the antenna turns around a constant rotation axis, with values that depend on the objectives to be achieved. Pat. document BR 10 2012 013956 1 A2 describes a Weather Radar System that uses a set of rotary antennae with beamwidth of the order of 1° in elevation and 90° to 120° in azimuth, turning at about 450 rpm, for detecting, identifying and locating weather phenomena such as turbulence, rain, snow, hail, etc. This is a heavy and complex structure, supported on the ground and thus unsuitable for installing on aircraft.

Patent document PI0711331 entitled METHOD FOR SIMULTANEOUS DETECTION OF SHIPS AND RADAR MAPPING OF POLLUTANT SLICKS, BY MEANS OF ROTATING AIRBORNE RADAR (Quellec, J-M.; Chabah, M.) describes an on-board radar system in aircraft that uses an antenna rotating 360° which simultaneously inspects a maritime area detecting the presence and movement of ships and also maps slicks of pollutants such as oil. This system does not provide for the detection of objects or obstacles situated at a short distance from the aircraft.

U.S. Pat. No. 5,451,957 entitled RADAR DEVICE FOR OBSTACLE WARNING (Klausing, H.) discloses a radar used for detecting obstacles at short distances, whose antennae turn solidarily with the rotor of a helicopter. Said antennae have an angular aperture of 45° or 70° in azimuth and use the ROSAR technique (by the same inventor and described in U.S. Pat. No. 5,017,922) to obtain a resolution under 1° in locating targets.

These radars, with rotary antenna, do not measure elevation and only present 3D imaging for moving targets. Since the aperture of the antenna is of the order of degree units, the field of vision presented to the pilot is small, where the field of vision should be of the order of 15° upwards and 35° downwards of the horizon line. Another drawback of radars in the state of the art is the fact that they do not present the images in perspective, which would give the pilot total knowledge of the region. Another omission is the fact that it does not measure elevation, by triangulation, for multiple targets with the same speed.

OBJECTIVES OF THE INVENTION

In light of the above, the main objective of the invention is to broaden the field of vision for the pilot of an aircraft, chiefly helicopter, which oftentimes flies at low altitude, and so has a need for better knowledge of objects, fixed or moving which are located within the range of action.

Another objective is that of broadening the vertical angle of the region scanned by the radar and provide an almost real three-dimensional image to the operator or pilot.

SUMMARIZED DESCRIPTION OF THE INVENTION

The above objectives are achieved by using a plurality of antennae disposed on the periphery of a rotary circle turning between 150 and 900 rpm, each antenna having a wide beam in azimuth and a narrow beam in elevation, each antenna point to a fixed elevation angle, said elevation angles being progressively varied from one antenna to the next so as to cover a region extending above and below the plane of said rotary circle acting as support thereto.

In accordance with another characteristic of the invention, each antenna has a beamwidth of the order of dozens of degrees in azimuth and of the order of degrees in elevation.

In accordance with another characteristic of the invention, said antennae are provided by slotted waveguides or other appropriate technological solution.

In accordance with another characteristic of the invention, the increased accuracy in azimuth is provided by the ROSAR technique of processing the signals returning from said antennae.

DESCRIPTION OF THE DRAWINGS

The other advantages and characteristics of the invention will be better understood by the description of a preferred embodiment and the drawings referring thereto, wherein.

DETAILED DESCRIPTION OF THE INVENTION

The Synthetic Aperture Radar (SAR) systems originally described by Klausing and Keydel in U.S. Pat. No. 5,017, 922 entitled Radar System Having a Synthetic Aperture on the Basis of Rotating Antennae), airborne or orbital, has evolved significantly with the combination of the use of various frequencies or bands, X, L, P and the polarization (indicates the direction of the electric field of the wave transmitted or received), Vertical (V) or Horizontal (H) of the signals emitted and received, with equal or inverted polarization (VV, HH or VH), obtaining high definition images, in color and 3D. The combinations of the techniques used are dictated by the objective to be achieved, comprising maps, level curves, surface model, treetop height and others, particularly flight control systems for pilots of aircraft.

Figure 1:
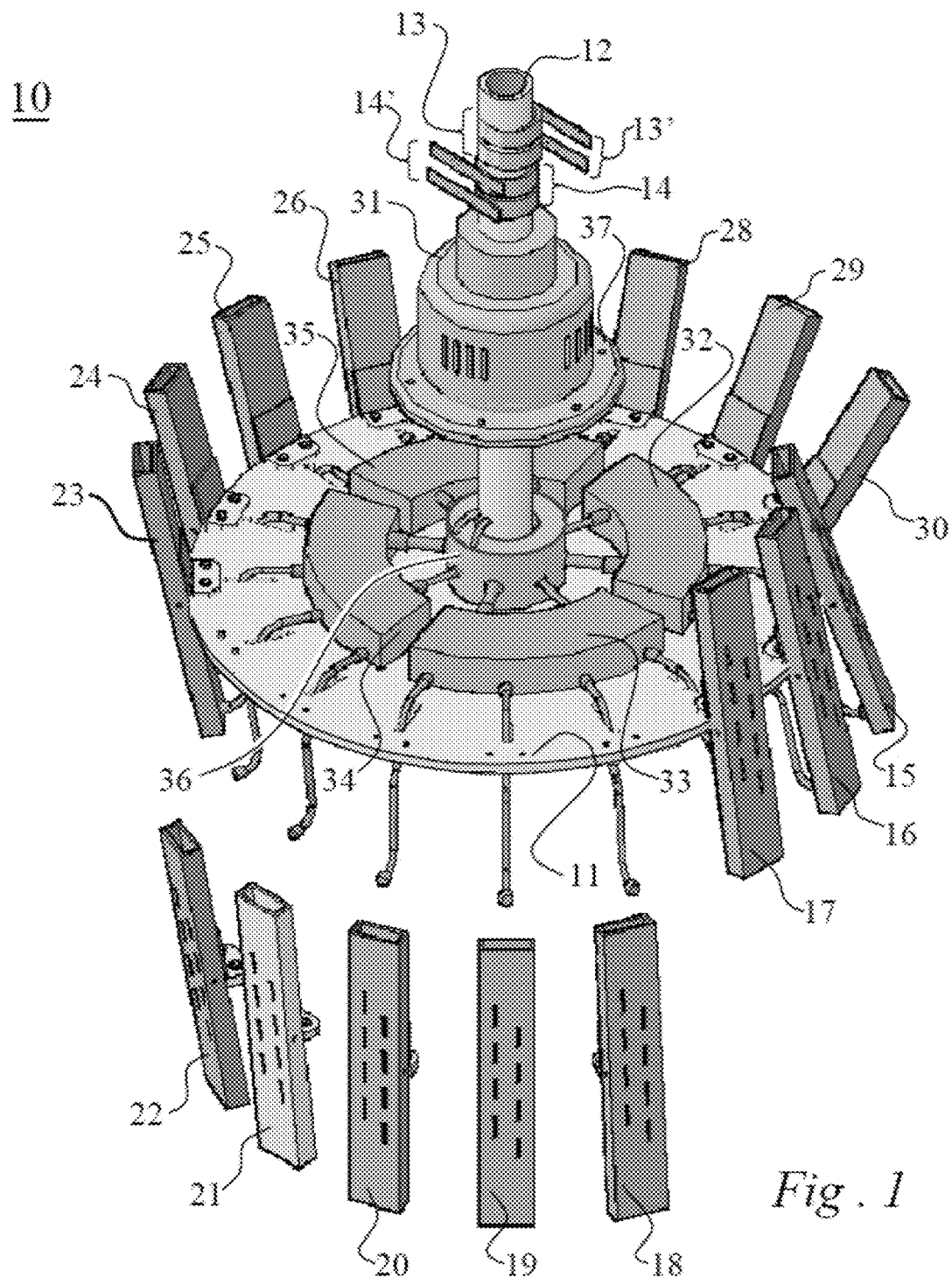
FIG. 1 is a perspective view of the proposed system.
Figure 2:
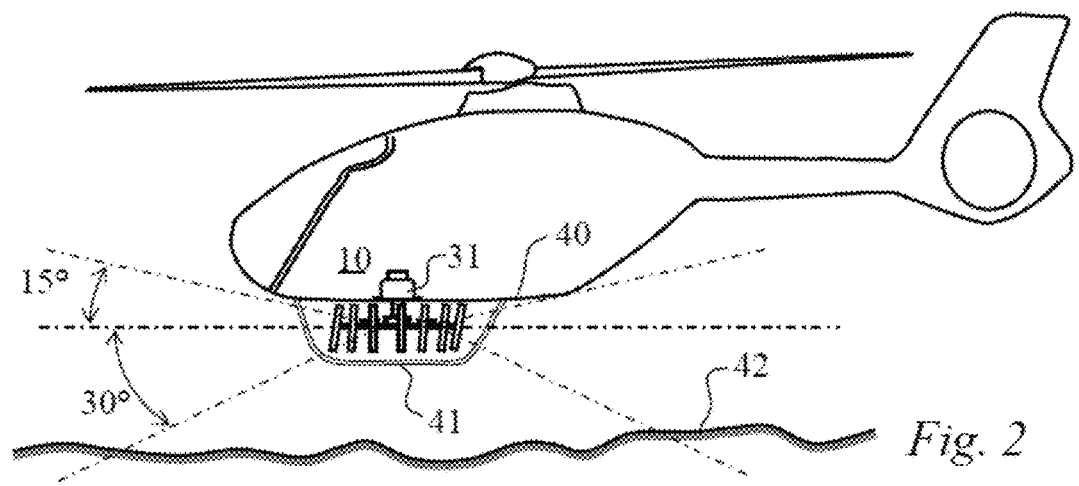
FIG. 2 is a simplified view of the system installed on a helicopter.

As can be inferred from FIG. 1, the present invention comprises a plurality of antennae 15, 16, 17, ... 30, consisting of slotted waveguides, regularly disposed on a circular base 11 with axis of rotation 12 driven by an engine 31 which is fastened by way of a flange 37 to the fuselage 40 of an aircraft, as illustrated in FIG. 2. This figure also shows that said circular base and said antennae are outside the fuselage, being protected by a radome 41. This arrangement allows the fuselage to be made of metal, potentially bulletproof, as required by aircrafts destined for combat.

Further according to FIG. 1, it is noted that the antennae do not point in the same elevation, being directed at rising angles, 3° by 3° starting from antenna 15 which points to an angle of 15° above the plane of the base 11. Thus, the last antenna of this set points to an angle of 30° below this plane, which is more clearly illustrated in FIG. 2, in the present exemplary embodiment.

Figure 3:
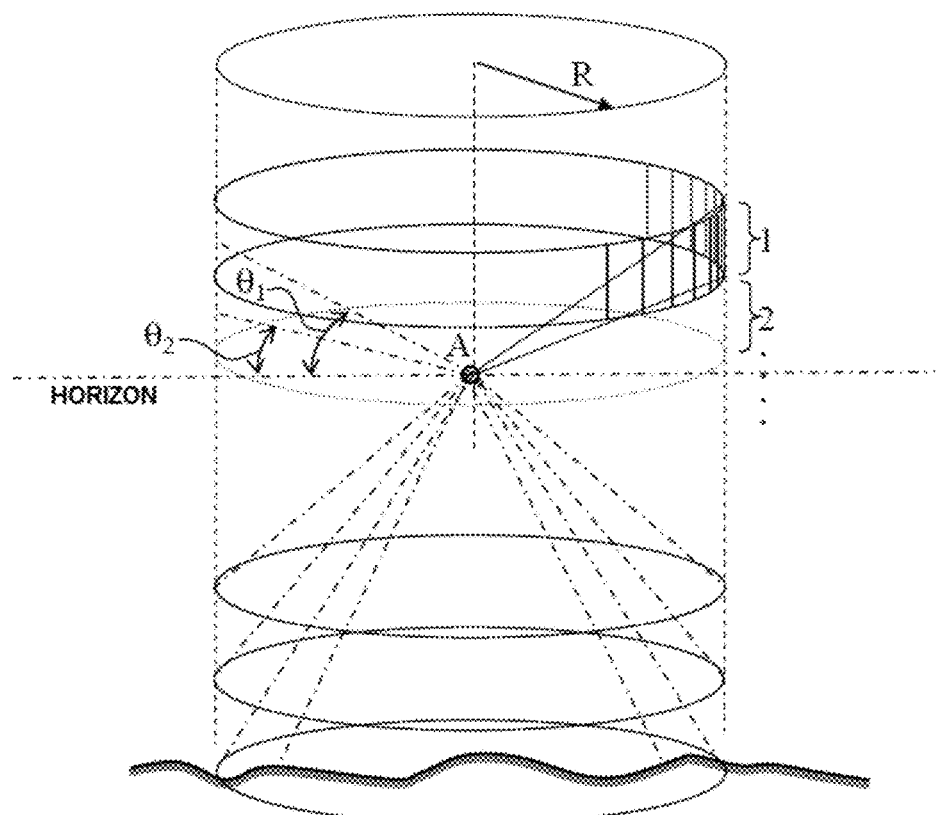
FIG. 3 shows the region of the space monitored by the system of the invention.

Each antenna corresponds to a radar, thus consisting of an exemplary embodiment in discussion of 16 radars, each one scanning a swath whose coverage is a cone with a height of 3°, as schematized in FIG. 3. The set of these cones forms a cylinder which extends from the first upper swath 1 to the last lower swath, which partially or totally covers the land 42, as illustrated in FIG. 2.

The axis 12 is tubular to enable the passage of the electric wiring, and the information provided by the system and its forwarding to the other on-board equipment, by sliding contacts 13-13' and 14-14'.

According to FIG. 1, the antennae are connected to the blocks 32, 33, 34 and 35 which house the analog front-end circuits of the radar signals, which after being digitalized are sent to the central block 36 for further treatment and forwarding to said sliding contacts.

Figure 4:
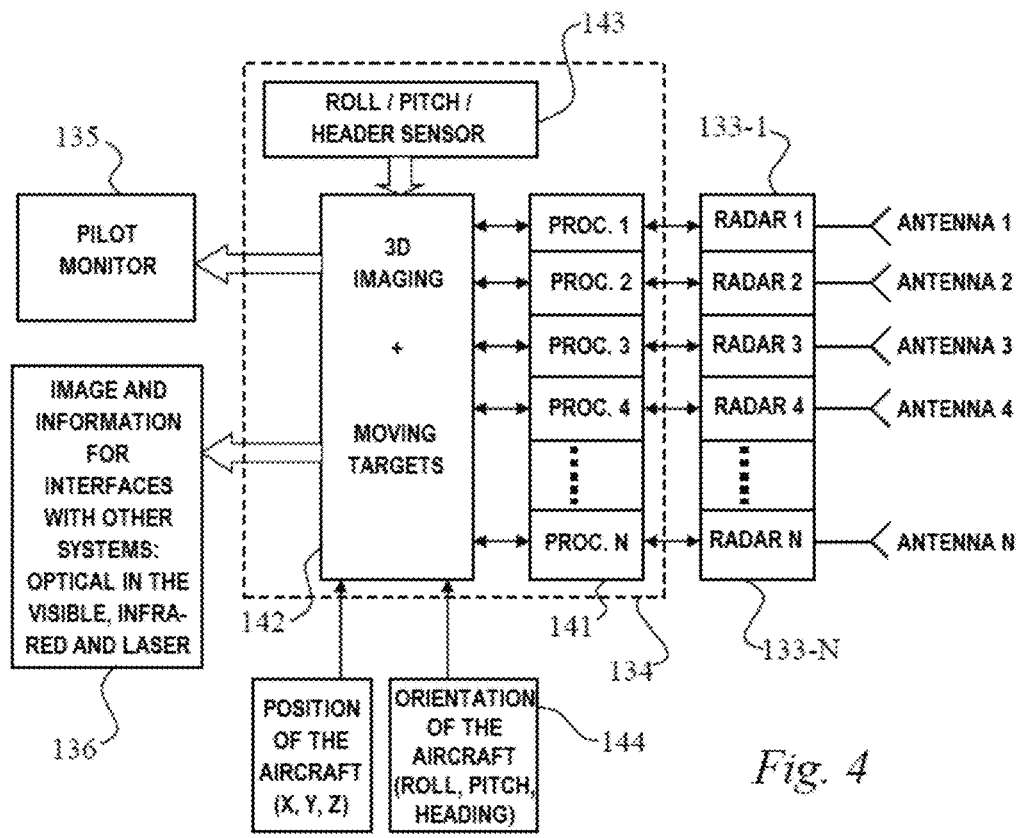
FIG. 4 is a block diagram of the system of the invention.
Figure 5:
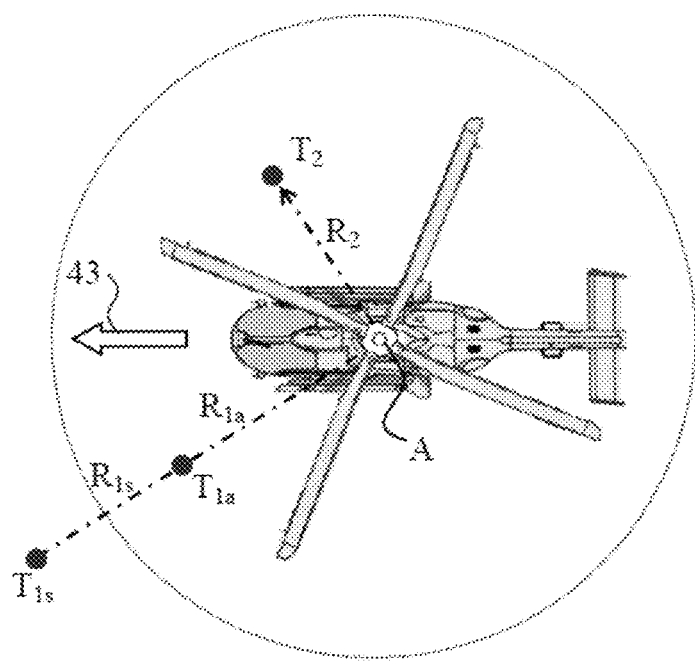
FIG. 5 refers to detecting various obstacles with the aircraft in movement.

For a more detailed exposition of the invention, we shall now draw reference to FIGS. 3, 4 and 5. As shown in the first of these figures, the aircraft is located at A, coinciding with the axis of the cylinder with radius R and with horizon line H.

The visualization method for aircraft navigation and landing is based on the use of N radars (in the present case, N=16), each provided with an antenna pointed to elevation angle θe. Radar 1 has a positive elevation angle θ1. Radar 2 has the beam pointed to an elevation angle θ2, 3° less than the prior one and so on and so forth, and radar 4 (not illustrated in FIG. 3) points towards horizon H, that is, with θ4 equal to zero. Radars 5 to N present negative elevation angles. Radar N present the most negative elevation angle. The beams with positive θe are for detecting obstacles above the aircraft, such as high voltage power lines. Those with θe near zero for detecting obstacles in front of the aircraft. Those with θe below zero for detecting obstacles beneath the aircraft and also on the ground. The last beams are dedicated for imaging the ground.

FIG. 5 exemplifies the operation of the system in the presence of 3 targets: T1a, T1s and T2. T2 has a range R2 and is only seen by radar 2, since the other radars have elevation angles that do not illuminate T2. In this case, the radar operator knows that the target T2 is above the horizon.

The targets T1a and T1s are only seen by the beam N−1. Thus the operator knows that they are near the ground. From the known angles θ2 and θn−1 and from the range, the operator knows exactly the position of the 3 targets in relation to the aircraft.

The height of the aircraft in relation to the ground is also extracted automatically. The last beams such as N and N−1 present the range of the last target, which is the ground.

This is the major advantage of the system of the invention: the operator has a safe and comprehensive vision of all the targets near the aircraft on a cylinder which begins above the aircraft and extends as far as the ground.

Additionally, the system provides the speed measurement of the target, since it has Doppler processing. If the target is moving, the radar will provide its radial speed. The target may be a car or the projectile of a firearm or a missile.

Through ROSAR processing, each of the N radars has a very high resolution in azimuth, general below 0.5 degrees. In this case, the target T2 is located to the right of the aircraft and the targets T1a and T1s to the left of the aircraft, the displacement of which is symbolized by the arrow 43.

The resolution in azimuth of each of the radars is approximately:

$$\theta azimuth = \lambda/(2*D),$$

wherein λ is the wavelength and D is the rotation diameter of the radar antenna according to the ROSAR principle.

The resolution in range is given by:

$$R \text{ range} = 2*C/B,$$

wherein C is the speed of light and B the bandwidth of the transmission pulse, and also the bandwidth of the system.

The resolution of each beam of the radar in elevation, that is, the value of θelevation is given by:

$$\theta elevation = \lambda/L,$$

wherein L is the vertical length of the radar antenna.

Based on the preceding description, the target T2 is represented here by a high voltage power line, is to the right and above the aircraft. Targets T1a and T1s to the left and below the aircraft. Target T1a is represented by a tree, stationary target, posing a threat of collision with the aircraft. Target T1s is on the ground, but in movement at radial speed V. Since the N radars are Doppler radars, they can measure the radial speed of the target directly.

As an example of requirements of this system for helicopters, a range radius of 3 km is considered, the most positive θe is 15 degrees and the most negative is −35 degrees.

The rotation diameter of the antennae is between 0.3 m and 3 m, preferably from 1 to 2 meters, providing an angular resolution in azimuth of tenths of a degree. The resolution in range is 1 m being achieved with a pulse and band width of the system of 200 MHz. The resolution in elevation is 3 degrees, being achieved by an antenna with a length of 17 cm using a frequency of 35 GHz.

FIG. 4 presents a block diagram of the system. The N antennae, with different N angle elevations are connected to their respective radio frequency systems, 133-1 to 133-N, where the frequency converters are found, along with the transmission channel with power amplifier and the reception channel with a low noise amplifier at the input.

Thereafter, all the analog outputs and inputs of the RF systems, 133-1 to 133-N, are connected to the processing system 134. It consists of N processors and signal generators, 141-1 to 141-N, which generate the transmission pulse, digitalize the reception signal, make the processing in the range direction to obtain a high resolution in range, make the ROSAR processing to obtain a high resolution in azimuth and make the Doppler processing to determine the speed of each target.

The 3D imaging subsystem and indication of the moving targets, 142, geometrically joins the N images or slices of the N radars, each scanning a different elevation angle, and forms a three-dimensional image for the operator. Additionally, it adds the speed of moving targets graphically. For geometric correction of the three-dimensional image, the information on position and orientation of the aircraft are used.

The orientation sensor, 143, located on the fixing platform of the antennae, provides the roll, pitch and heading angles of the N antennae 15 to 30 (see FIG. 1), due to the fact that the rotary system may be coupled to the aircraft by way of a Cardan axis.

The three-dimensional image generated by 134 is sent to the monitor of the pilot or operator 135 and also to other navigation support systems of the aircraft 136.

For the three-dimensional image to have frequent updates and the system to accompany the movements of the aircraft, the rotation of the antennae for generating the synthetic aperture ROSAR must be in the magnitude of hundreds of rotations per minute such as, for example, varying between 150 and 900 rpm. In the example under discussion, a rotation of 600 rpm is adopted.

Although the invention was described based on a specific exemplary embodiment, it is understood that modifications may be made by persons skilled in the art, provided that they are kept within the ambit of the invention.

So, for example, the irradiating elements 15, 16, . . . , 30 which, in the present exemplary embodiment, are provided by slotted waveguides, may be replaced by antennae based on other technologies, such as planar technology, provided they have similar radiation direction characteristics.

Accordingly, the invention is defined and limited by the accompanying set of claims.

The invention claimed is:

1. An airborne radar system for detecting and visualizing targets, comprising:
 a plurality of antennas, structured to be regularly disposed on a rotary base that is mechanically coupled to rotate with an engine, the rotary base defining a plane, elevation orientations of said plurality of antennas being staggered according to a defined pattern from one antenna to the next so the plurality of antennas cover a three-dimensional region or layer extending above and below the plane of said rotary base,
 the plurality of antennas being electrically connected to at least one radar device structured to furnish information from the combined plurality of antennas relating to distance, azimuth, elevation and speed of fixed and moving objects above and below the plane defined by said rotary base, and
 a computer operatively connected to the at least one radar device, the computer generating a three-dimensional representation of the three-dimensional region or layer covering an angle of 360 degrees in azimuth.

2. The airborne radar system as claimed in claim 1, wherein said defined pattern consists of uniform and sequential variations of the elevation angles of said plurality of antennas.

3. The airborne radar system as claimed in claim 1, wherein a first of the plurality of antennas has an elevation angle above the plane of said rotary base, and following ones of the plural antennas have elevation angles progressively descending, finalizing with angles below said plane.

4. The airborne radar system as claimed in claim 1, wherein said computer is structured to use a rotating synthetic aperture radar (ROSAR) technique to determine the resolution in azimuth of each object.

5. The airborne radar system as claimed in claim 1, wherein said computer is structured to use Doppler processing to determine the speed of each moving object.

6. The airborne radar system as claimed in claim 1, wherein said rotary base is coupled to an aircraft by a Cardan joint.

7. The airborne radar system as claimed in claim 1, wherein said plurality of antennas comprise slotted waveguides.

8. The airborne radar system as claimed in claim 1, wherein said plurality of antennas comprise planar antennas.

9. An airborne radar system for detecting and visualizing targets, comprising:
 a rotating radar scanning antenna array comprising plural antennas N having respective elevation angles and structured to simultaneously scan N layers or regions superimposed by radars with (a) a range resolution defined by the bandwidth of the radar, (b) an azimuth resolution defined by the effective length of a circular synthetic aperture, and (c) an elevation resolution defined by the vertical apertures of the plural antennas;
 at least one radar receiver operatively connected to the rotating radar scanning antenna array and structured to obtain N corresponding radar images or image layers with the same inclination at the respective elevation angles of the plural N antennas, and
 at least one processor operatively connected to the at least one radar receiver, the at least one processor configured to form a three-dimensional image by geometric combination of the N radar images or image layers obtained, wherein the three-dimensional image is defined at least in part by voxels defined by the range resolution, the product of antenna elevation resolution with range and the product of the azimuth resolution with range.

10. The airborne radar system as claimed in claim 9, wherein said scanned N layers or regions comprise conical layers or regions scanned by different ones of said plural antennas having different elevation angles.

11. The airborne radar system, as claimed in claim 9, wherein said respective elevation angles of said N antennas vary by uniform steps between an initial angle above the horizon and a final angle below the horizon.

12. The airborne radar system, as claimed in claim 9, wherein said plural antennas each scan circular paths of 360 degrees, at a constant speed between 150 rpm and 900 rpm.

13. The airborne radar system, as claimed in claim 12, wherein said circular paths have a diameter between 30 cm and 3 meters.

14. An airborne radar system for use with an aircraft having a rotating rotor, the system comprising:
 a plurality N of slotted waveguide antennas mounted about a circumferential periphery of the rotor such that the plurality N of slotted waveguide antennas turn with the rotating rotor, each of the plurality N of slotted waveguide antennas mounted at a respective elevation angle, the respective elevation angles of the plurality N of slotted waveguide antennas varying from one antenna to another such that the antennas scan N respective elevational swaths as the rotor rotates;
 radar transceiving equipment operatively coupled to the slotted waveguide antennas, the radar transceiving equipment providing N respective image slices corresponding to respective elevational swaths scanned by the N corresponding slotted waveguide antennas; and a computer operatively coupled to the radar transceiving equipment, the computer geometrically joining the N respective image slices provided by the radar transceiving equipment to provide a conjoined three-dimensional image.

15. The system of claim 14 wherein the respective elevation angles are set so that the conjoined three-dimensional image shows a region extending above and below the horizon.

16. The system of claim 14 wherein the radar transceiving equipment and the computer are structured to use rotor synthetic aperture radar techniques.

17. The system of claim 14 wherein the plurality N of slotted waveguide antennas are mounted so that a first antenna has a first elevation angle, a second antenna has a second elevation angle less than the first elevation angle, and an Nth antenna has an Nth elevation angle less than the second elevation angle.

18. The system of claim 14 wherein the first elevation angle is above the horizon and the Nth elevation angle is below the horizon.

19. The system of claim 14 wherein the aircraft senses position and orientation, and the computer uses the sensed position and orientation to correct the three-dimensional image.

20. The system of claim 14 wherein the radar transceiving equipment measures Doppler shift, and the computer includes Doppler-based indications of target speed in the three-dimensional image.

* * * * *